(12) United States Patent
Jiang et al.

(10) Patent No.: US 12,712,736 B2
(45) Date of Patent: Aug. 18, 2026

(54) DEVICE DATA HASHING

(71) Applicants: Lemon Inc., Grand Caymon (KY); Beijing Zitiao Network Technology Co., Ltd., Beijing (CN)

(72) Inventors: Bo Jiang, Culver City, CA (US); Wanrong Zhang, Culver City, CA (US); Donghang Lu, Culver City, CA (US); Jian Du, Culver City, CA (US); Qiang Yan, Beijing (CN)

( * ) Notice: Subject to any disclaimer, the term of this patent is extended or adjusted under 35 U.S.C. 154(b) by 15 days.

(21) Appl. No.: 18/759,197

(22) Filed: Jun. 28, 2024

(65) Prior Publication Data

US 2026/0005867 A1 Jan. 1, 2026

(51) Int. Cl.
*H04L 9/32* (2006.01)
*G06F 21/62* (2013.01)

(52) U.S. Cl.
CPC .................................. *H04L 9/3236* (2013.01)

(58) Field of Classification Search
CPC .. H04L 9/3236; H04L 9/0643; H04L 63/0428
See application file for complete search history.

(56) References Cited

U.S. PATENT DOCUMENTS 10,693,651 B1 * 6/2020 Kennedy .............. H04L 9/3297
10,776,511 B2 9/2020 Decker et al.
11,886,413 B1 * 1/2024 Casanova ........... G06F 16/2264
2010/0077219 A1 * 3/2010 Moskowitz ........... G06T 1/0028 713/176
2017/0302693 A1 * 10/2017 Takada ................ H04L 63/1425
2020/0068013 A1 * 2/2020 Zakharov ................ G06F 21/78
2022/0108040 A1 * 4/2022 Yoo ....................... G06F 21/604
2023/0274160 A1 * 8/2023 Mujumdar ............. G06N 5/022 706/12
2023/0300115 A1 * 9/2023 Gharibi .................. G06N 3/098 706/3
2024/0032109 A1 * 1/2024 Maternia .............. H04B 7/0408
2024/0214212 A1 * 6/2024 Hamada ................... G09C 1/00

OTHER PUBLICATIONS

Mahmoud et al., "Enhancing LSB Using Binary Message Size Encoding for High Capacity, Transparent and Secure Audio Steganography—An Innovative Approach," IEEE Access Year: 2022 | vol. 10 | Journal Article | Publisher: IEEE.*

(Continued)

*Primary Examiner* — Roderick Tolentino
(74) *Attorney, Agent, or Firm* — Fish & Richardson P.C.

(57) ABSTRACT

Methods, systems, and apparatus, including computer programs encoded on computer storage media, for hashing data on client devices. One of the methods includes generating, using a hash function, an output value that is in a hashing domain for the hash function; accessing a message size that is a smaller value than a domain size of the hashing domain; generating, using the hash function and the message size, one or more noise values; generating a message that includes the one or more noise values; and providing, to an external system, the message.

19 Claims, 3 Drawing Sheets

(56) References Cited

OTHER PUBLICATIONS

Njuom et al., "Secure Data Hiding and Transmission Utilizing Multi-Layered Cryptographic and Steganographic Techniques with High Capacity," 2025 International Conference on Electrical Engineering and Informatics (ICEEI) Year: 2025 | Conference Paper | Publisher: IEEE.*

Apple.com [online], "Learning with Privacy at Scale," Dec. 2017, retrieved on Aug. 2024, retrieved from URL<https://docs-assets.developer.apple.com/ml-research/papers/learning-with-privacy-at-scale.pdf>, 25 pages.

Erlingsson et al., "RAPPOR: Randomized Aggregatable Privacy-Preserving Ordinal Response," CoRR, submitted on Aug. 2014, arXiv:1407.6981, 14 pages.

Shah et al., "Optimal Compression of Locally Differentially Private Mechanisms," CoRR, submitted on Feb. 2022, arXiv:2111.00092, 44 pages.

Wang et al., "Locally Differentially Private Protocols for Frequency Estimation," In the Proceedings of the 26th USENIX Security Symposium, Vancouver, BC, Canada, Aug. 16-18, 2017, 19 pages.

Extended European Search Report in European Appln No. 25185647.2, dated Oct. 28, 2025, 7 pages.

Fang et al., "Local differential privacy for human-centered computing," EURASIP Journal on Wireless Communication and Networking, Mar. 2020, 2020:65, 12 pages.

Qin et al., "A Frequency Estimation Algorithm under Local Differential Privacy," In Proceedings of the 15th International Conference on Ubiquitous Information Management and Communication (IMCOM), Jan. 4-6, 2021, Seoul, South Korea, 5 pages.

* cited by examiner

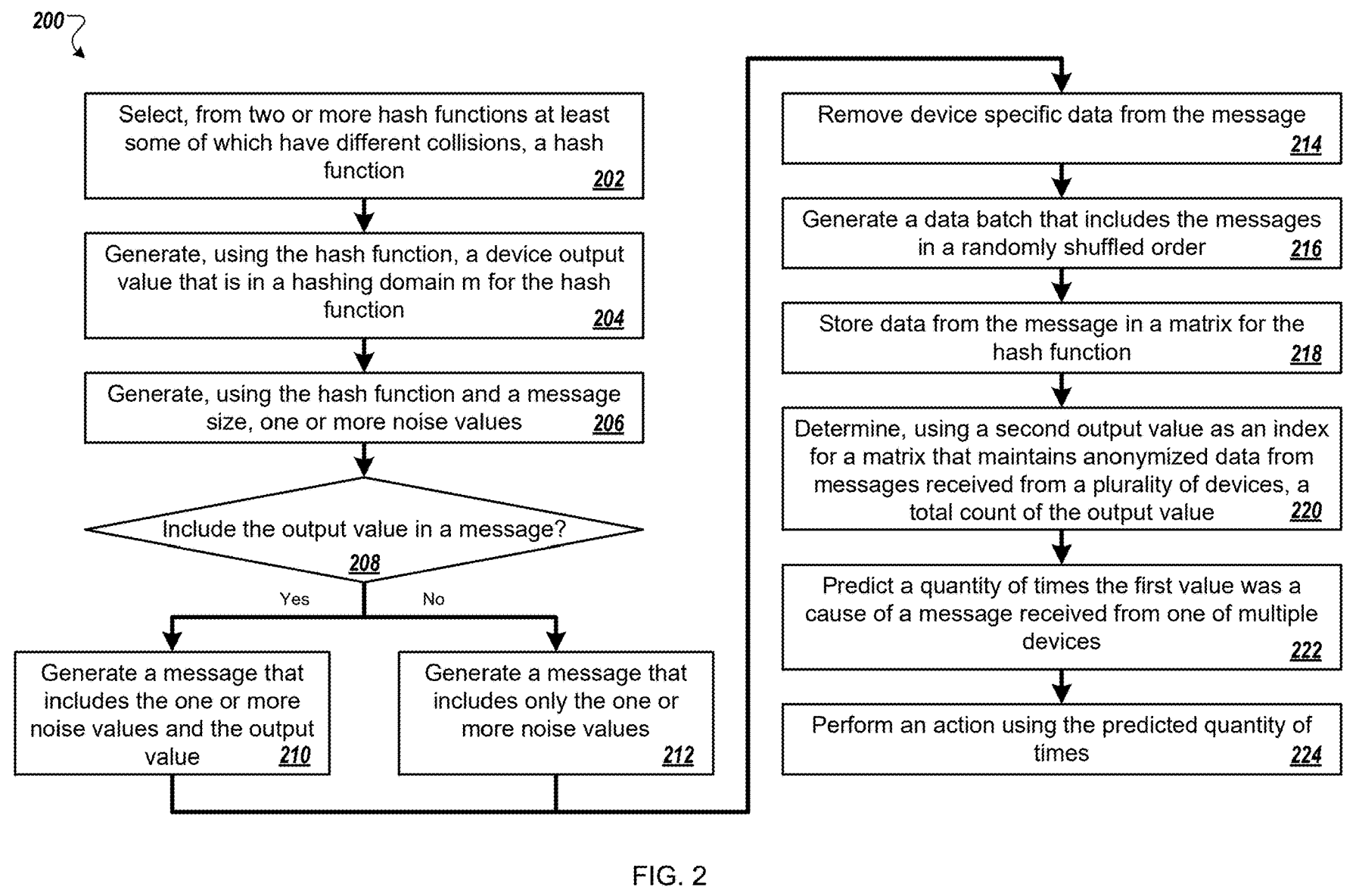

200

Select, from two or more hash functions at least some of which have different collisions, a hash function 202

Generate, using the hash function, a device output value that is in a hashing domain m for the hash function 204

Generate, using the hash function and a message size, one or more noise values 206

Include the output value in a message? 208

Yes

No

Generate a message that includes the one or more noise values and the output value 210

Generate a message that includes only the one or more noise values 212

Remove device specific data from the message 214

Generate a data batch that includes the messages in a randomly shuffled order 216

Store data from the message in a matrix for the hash function 218

Determine, using a second output value as an index for a matrix that maintains anonymized data from messages received from a plurality of devices, a total count of the output value 220

Predict a quantity of times the first value was a cause of a message received from one of multiple devices 222

Perform an action using the predicted quantity of times 224

FIG. 2

DEVICE DATA HASHING

BACKGROUND

Various systems can communicate over a network. For instance, a client device can send data to a server device, e.g., a cloud computing server. The data communicated over the network can be encrypted to increase data privacy, data security, or both.

SUMMARY

Some client devices can transmit data to a recipient processing system, e.g., a server or a cloud system, for analysis. Sending plain text data can have privacy concerns, security concerns, or both. For instance, a malicious actor can access the data before it is received by the recipient processing system. In some examples, the recipient processing system shouldn't be allowed access to data that is not anonymized, e.g., given user permissions.

To increase data security, reduce communication cost, or both, a client device can perform one or more local differential privacy operations on data for transmission. This can include generating a result using a hash function, adding the result to an output vector, and introducing noise into the output vector. In some examples, the client device can select a hash function, randomly permute locations of values in the output vector, or a combination of both. The client device can transmit the output vector, e.g., an encrypted output vector, to the recipient processing system.

The recipient processing system can decrypt the output vector and extract one or more values from the decrypted vector. The recipient processing system can use an identifier for the hash function to determine a mapping to one or more original values, e.g., that are potential inputs to the hash function that can cause generation of the result. The recipient processing system can update values of a matrix of values using the output vector. For instance, the matrix can include combinations of values from multiple different client devices. The combination of values can represent a total count of output vectors that included values that mapped to corresponding locations in the matrix. The recipient processing system can then use the matrix to perform one or more operations, e.g., given a number of client devices that had particular values in their corresponding output vectors.

The subject matter described in this specification can be implemented in various implementations and may result in one or more of the following advantages. In some implementations, the systems and methods described in this specification can have a reduced communication cost, e.g., by using output values, noise values, or both, that were generated using a hash function. For instance, instead of sending an array that includes one value for each potential value in the domain, using of hash values can reduce the amount of data communicated. In some implementations, the systems and methods described in this specification can have fewer data collisions, a more uniform collision distribution, more accurate original value retrieval, or a combination of these, e.g., by using output values, using a hash function from a plurality of hash functions, or both, compared to other systems. For example, selecting one of multiple different hash values can increase representations of original data since there will be a lower likelihood of common collisions across different hash functions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for processing messages.

Like reference numbers and designations in the various drawings indicate like elements.

DETAILED DESCRIPTION

Figure 1:
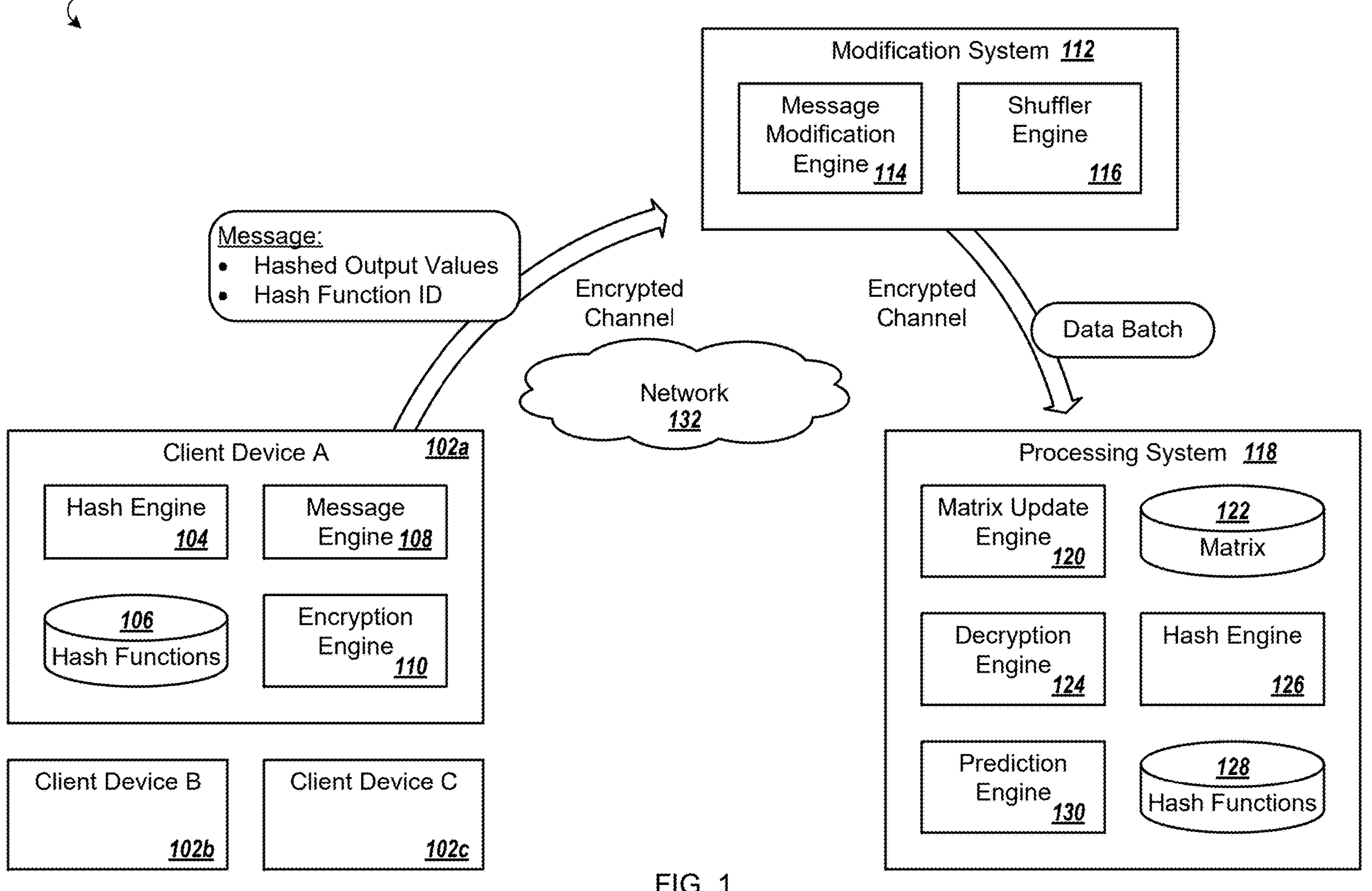
FIG. 1 depicts an example environment in which one or more client devices provide data to a processing system using local differential privacy.

FIG. 1 depicts an example environment 100 in which one or more client devices 102*a-c* provide data to a processing system 118 using local differential privacy. The client devices 102*a-c* can use one or more local differential privacy ("LDP") operations to increase security of data transmitted to the processing system 118, reduce a communication cost of the transmission, e.g., in network bandwidth or other computational resources, or a combination of both.

The client devices 102*a-c* can use an LDP framework to mask some of the data for transmission to the processing system 118. The masking can cause the data to be anonymized before the data is transmitted by the respective client devices 102*a-c*. Compared to other systems in which the masking is performed by the processing system 118 or not performed at all, masking by the client devices 102*a-c* can increase data security and, as a result, data privacy by reducing a likelihood that a bad actor will be able to determine the specific data that is specific to a corresponding client device 102*a-c*.

The masking can include any appropriate operations on source data. For instance, the client devices 102*a-c* can generate noise data and combine the noise data with the source data. The client devices 102*a-c* can send the combined data to the processing system 118 for processing. Although the processing system 118 won't have only the source data, but will also have the noise data, the processing system 118 will still be able to process the combined data such that a utility of the results is substantially similar to a utility of processing results for the source data alone.

The client device A 102*a*, as an example of the client devices A-C 102*a-c*, includes a message engine 108. The message engine can generate a message by combining an output value, as an example of the source data, with one or more noise values. The output value can be any appropriate type of output, such as an output of an application executing on the client device A 102*a*.

An encryption engine 110 can encrypt the message for transmission to the processing system 118. The encryption engine 110 can use any appropriate process for encrypting the message.

The client device A 102*a* can transmit the encrypted message to the processing system 118. The processing system 118 receives the encrypted message. The processing system 118 can decrypt the encrypted message, e.g., using any appropriate process that corresponds to the encryption process.

The processing system 118 can use a prediction engine 130 to predict outputs given the data from the decrypted message. For instance, given a number of messages, e.g., included in a data batch, received from different ones of the client devices A-C 102*a-c*, all of which include at least some noise, the prediction engine 130 can make one or more inferences using the data batch. The processing system 118 can perform one or more actions using the one or more inferences.

In some implementations, the environment 100 includes a modification system 112. The environment 100 can use the modification system 112 to increase data security, privacy, or both. For instance, the client device A 102*a* can provide the encrypted message to the modification system 112.

The modification system 112 includes a message modification engine 114. The message modification engine 114 removes data from the received message, e.g., to increase data security, privacy, or both. For instance, the message modification engine 114 can generate a second encrypted message that includes the encrypted body of the previous message but without any data that is specific to the client device A 102*a* from which the encrypted message was received, e.g., without any device A specific data. In this way, the second encrypted message can be further anonymized compared to the anonymized encrypted message. The message modification engine 114 can remove any device identifiers or other types of data that could potentially be used to associate the encrypted body of the message with the source client device A 102*a*. In some examples, the message modification engine 114 removes a header from the encrypted message to generate the second encrypted message that only includes the encrypted data from the body of the encrypted message.

The modification system 112 can include a shuffler engine 116 that randomly shuffles the second encrypted messages. For example, the modification system 112 can receive n encrypted messages from various client devices 102*a-c*. The modification system 112 can receive more than one message from some of the client devices 102*a-c*. The modification system 112 can receive a single message or no messages from some of the client devices 102*a-c*.

The shuffler engine 116 can, e.g., randomly, change the order in which the second encrypted messages are included in a data batch. For instance, as the modification system 112 receives encrypted messages, the modification system 112 can add the encrypted messages to a data batch, e.g., with a maximum size n, in an order in which the encrypted messages are received. When the modification system 112 determines that a transmission criterion is satisfied, e.g., a time criterion or the data batch includes the maximum size n of encrypted messages, the shuffler engine 116 changes the order in which the encrypted messages are included in the data batch to a second order that is different from the received in order. For example, the shuffler engine 116 can randomly change the order of two or more messages in the data batch, e.g., using any appropriate random permutation operations such as entry-by-entry brute force or Fisher-Yates.

In some examples, the modification system 112 can discard a message received from one of the client devices 102*a-c*. For instance, upon receiving a message from the client device A 102*a*, the modification system 112 can determine whether a number of messages received from the client device A 102*a* satisfies a message threshold, e.g., a maximum number of messages that can be received from any client device. If the threshold is not satisfied, the modification system 112 can process the message, e.g., using one or both of the message modification engine 114 or the shuffler engine 116.

If the threshold is satisfied, the modification system 112 can determine to skip processing the message. This can include deleting the data for the message from memory. By determining to skip processing the message, the modification system 112 can increase data security, e.g., reducing a likelihood that sensitive data for the client device A 102*a* might be inferred by the processing system 118. By determining to skip processing the message, the modification system 112 can reduce a likelihood of a data poisoning attack affecting any analysis by the processing system 118, e.g., destroying the aggregation in the data batch.

The processing system 118 can receive the data batch from the modification system 112. The processing system 118 can process the encrypted messages included in the data batch, e.g., as described above.

In some implementations, after decrypting the encrypted messages, e.g., from the data batch and using the decryption engine 124, a matrix update engine 120 included in the processing system 118 can update a matrix 122 using data from the decrypted message. For instance, the decrypted message, e.g., the combined data generated by the client device A 102*a*, can identify one or more locations in the matrix 122 that should be updated. The matrix 122 can include one entry for each of a fixed number of values generated by the client devices 102*a-c*, whether the values are the original output values or noise values. The values can represent any appropriate type of data, such as data generated by an application executing on the respective client device 102*a-c*, e.g., a social media application. In some examples, the values can represent a search string, a uniform resource identifier ("URI"), a website, a news article, or other appropriate types of data for an application on the client device 102*a-c*. For example, each location in the matrix 122 can indicate a number of times that the corresponding location was identified in a decrypted message. When the matrix 122 has one hundred locations, the fifteenth location can indicate a number of times that location was identified in a decrypted message. For instance, when a value at the fifteenth location is sixty-five, that indicates that sixty-five decrypted messages from any combination of client devices 102*a-c* identified the fifteenth location.

Some systems generate the combined data that includes both the output value and one or more noise values using unary encoding. In these systems, when the matrix 122 has m locations, and the values can be binary values that indicate whether the corresponding location is true, e.g., the corresponding URI was accessed or search string was used. Although combined data with m locations using unary encoding can maintain accuracy, transmission of a message with length m can use more computational resources than necessary, e.g., for the processing by the processing system 118. Further, although there can be a large variety of potential source data used to determine the output value, e.g., when the potential source data might be any of an infinite number of values such as URIs, the message itself cannot have an infinite length.

To reduce a size of the message, the client devices 102*a-c* can use a hash engine 104 to map an input domain for the source data from a large domain to a smaller, finite domain M. For instance, the hash engine 104 can map source data d to an output value in the finite domain M. The output value can be an integer that is limited by the domain M, e.g., in $\{1, \ldots, m\}$ or $\{0, \ldots, m-1\}$. Here, m can denote the hashing range and M can represent the hashing domain.

The message engine 108 can determine whether to include the output value in a message for the processing system 118. This can increase data security for the source data since the message might not always have a value for the actual source data. For instance, the message engine 108 can determine with a probability of 0.5 whether to include the output value in the message.

The message engine 108 can generate the message using a result of the determination whether to include the output value in the message. For instance, when the message engine 108 determines to include the output value in the message and given a size s for the message, the message engine 108 can determine to generate s−1 noise values. When the message engine 108 determines to not include the output value in the message and given the size s for the message, the message engine 108 can determine to generate s noise values.

The message engine 108 can select one or more noise values, e.g., from an extension domain $M_{\bar{r}}$. When the domain of output values is M={1, . . . , m} and for an output value of r, the extension domain $M_{\bar{r}}$ can be {1, 2, . . . , r−1, r+1, . . . , m}. The message engine 108 can use any appropriate process to select the one or more noise values. For instance, the message engine 108 can receive the output value r from the hash engine 104. The message engine 108 can compute the extension domain $M_{\bar{r}}$ using the domain M and the output value r. The message engine 108 can randomly select the noise values from the extension domain $M_{\bar{r}}$, e.g., given the determined number of noise values to select as either s or s−1.

The message engine 108 can generate a message for the processing system 118. The message can include any appropriate type of data structure that includes the one or more noise values and optionally the output value. For instance, the message engine 108 can generate an empty list v as the data structure. When including the output value r in the message, the message engine 108 can append the output value r to the empty list v. The message engine 108 can append the one or more noise values to the list v, whether v is an empty list or not.

In some examples, the message engine 108 can randomly permute the list v. For instance, when the output value r is appended to the beginning of the empty list v, the message engine 108 can determine to randomly permute the list v so that the order in which the values appear in the list v is less likely to indicate anything about the source data. The message engine 108 can determine to skip randomly permuting the list v when the list v does not include the output value r.

The encryption engine 110 can generate an encrypted message using the list v as the body of the message, e.g., and a public encryption key. For instance, the body of the message can include an encrypted version of the hashed output value r as a value in the list v.

Communications between the client devices 102*a-c* and the processing system 118 can use one or more encrypted channels. For instance, the communications can use a network 132 through which the messages, e.g., encrypted messages, are passed. The client devices 102*a-c* can each create a corresponding encrypted channel with the processing system 118, or the modification system 112 for implementations that include the modification system 112. The client devices 102*a-c* can then use the encrypted channels to transmit the messages to a corresponding destination, e.g., the modification system 112 or the processing system 118.

The processing system 118 receives the message that includes the list v. For instance, the processing system 118 can receive the encrypted message that encrypts the list v from either the client device A 102*a*, e.g., as a single message, or from the modification system 112, e.g., as a message in the data batch. The decryption engine 124 can decrypt the encrypted message, e.g., using a secret key.

The matrix update engine 120 updates the matrix 122 using data from the message, e.g., the decrypted message. When the output values are values in the domain M, the matrix 122 can have m values each of which correspond to a value in the domain M. For instance, the $i^{th}$ value in the domain M corresponds to the $i^{th}$ value in the matrix 122. In some examples, the matrix update engine 120 can add one to an existing value in the matrix at locations that are identified in the message. For example, when the message includes the value i, the matrix update engine 120 can add one to the existing value at the $i^{th}$ location in the matrix, e.g., matrix[i]=matrix[i]+1.

When the matrix update engine 120 determines that the matrix 122 does not exist, the matrix update engine 120 can initialize the matrix 122. For instance, the matrix update engine 120 can initialize the matrix to be an array of length m with each value in the array being zero.

The processing system 118 can determine to perform one or more actions using data in the matrix 122. For example, when the processing system 118 determines to perform an operation using a value d, the processing system 118 causes a hash engine 126 to compute a hash of the value d, e.g., the output value r. The hash engine 126 at the processing system 118 uses the same hash operations as the hash engine 104 at the client device A 102*a* so that the output values are the same for any given input value.

A prediction engine 130 determines a value in the matrix 122 for the output value r. For instance, the prediction engine 130 receives the output value r from the hash engine 126. The prediction engine 130 accesses the matrix 122 and determines the value C(d) stored in the matrix 122 for the output value r, e.g., a total count stored in the $r^{th}$ location of the matrix 122.

The prediction engine 130 uses the value stored in the matrix 122 for the output value r to predict a quantity of times $\hat{f}(d)$ the source data was the cause of a message received from one of the client devices 102*a-c*. The prediction engine 130 can use equation (1), below, to predict the quantity of times $\hat{f}(d)$ the source data was the cause of a message received from one of the client devices 102*a-c*. In equation (1), p can be the probability that the output value r is included in the message, e.g., 0.5 or another appropriate value. In some examples, p can be computed using equation (2), below. As indicated above, n is the number of messages included in the data batch and m is the number of values in the domain M. q can be a value based on a differential privacy parameter, e.g., computed using equation (3) or another appropriate equation, below. ε can be the differential privacy parameter that represents a degree of security for the messages, the output values included in the messages, or both. In some instances, one or both of equations (2) and (3) can be used for a value of ε that satisfies, e.g., is great than or equal to, a threshold value, e.g., a large ε value.

$$\hat{f}(d) = \frac{C(d) - \frac{pn}{m} - qn\left(1 - \frac{1}{m}\right)}{(p - q)\left(1 - \frac{1}{m}\right)} \tag{1}$$

$$p = \frac{e^{\varepsilon}}{(e^{\varepsilon} + 1)} \tag{2}$$

-continued $$q = \frac{1}{(e^{\varepsilon} + 1)} \quad (3)$$

The processing system 118 can perform one or more additional actions using the predicted quantity of times $\hat{f}(d)$ the source data was the cause of a message received from one of the client devices 102*a-c*. For example, the processing system 118 can perform analytics using the predicted quantity of times $\hat{f}(d)$, generate instructions that cause presentation of the predicted quantity of times $\hat{f}(d)$, or perform another appropriate action.

The processing system 118 can use equation (1) to predict the quantity of times $\hat{f}(d)$ to reduce an influence of the noise values on the data in the matrix 122. For instance, since the combined data that was the basis of the message body includes one or more noise values and optionally the output value, use of equation (1) can improve an accuracy of the predicted quantity of times $\hat{f}(d)$ compared to using the value C(d) stored in the matrix 122, e.g., the total count value.

In some implementations, the environment 100 can use multiple hash functions, each for a different message from multiple messages. Some messages from the multiple messages can include output values generated using the same hash function.

For example, the client device A 102*a*, and each of the other client devices B-C 102*b-c*, can maintain a database of hash functions 106. When determining to send a message to the processing system 118, the hash engine 104 can select one of the multiple hash functions from the hash functions database 106. This can increase an accuracy of the data received by the processing system 118, and any actions performed using the data, by reducing a number of the same collisions that can occur when using a single hash function. For instance, when using a single hash function, two source data values, X and Y, can result in the same output value $r_1$. By using two or more different hash functions, some of the hash functions might have a collision in which both X and Y result in the same output value r while others will not. For example, some hash functions will map X to $r_2$ and Y to $r_3$. As a result, the processing system 118 can process more accurate data since all instances of X and Y will not map to the same output value $r_1$.

The processing system 118 or another system or combination of systems can generate the hash functions. For instance, the processing system 118 can generate k independent hash functions $H=\{h_1, h_2, \ldots, h_k\}$. Each hash function can deterministically map a respective source data value d, e.g., any input value, to a discrete number in the domain M. In some examples, each hash function h can have a corresponding domain M at least some of which have a different hashing range m, e.g., $h_1$ can have the domain $M_1$, $h_2$ can have the domain $M_2$, and so on with some domains $M_i$ not equal to others $M_j$.

The processing system 118 can select at least some of the hash functions h that satisfy one or more generation criteria. Some generation criteria can require that a hash function h has a number of collisions that satisfies a collision criterion, e.g., as few collisions as possible. This can reduce utility loss by the processing system 118 when the processing system 118 processes the messages. In some examples, the generation criteria can require that hash function h has a substantially uniform random output distribution, e.g., reducing a likelihood that a collision occurs for high frequency source data d.

In some implementations, the processing system 118 can generate a hash function that maps URIs, e.g., web uniform resource locators ("URLs"). For source data x, the processing system can generate a hash function h(d): D→[m] for which the support of D can be infimum.

The processing system 118 can perform one or more encoding operations. For instance, given a web URL as the input source data, the processing system can determine an encoding scheme to convert the web URLs into bits. For instance, the processing system can determine to apply ASCII encoding where every character in the web URL is mapped to a seven-bit value. The processing system can treat the resulting value as a big number.

The processing system 118 can determine a hash function, e.g., $h_k(d)=d+k \bmod m$. The processing system 118 can determine the hash function $h_k(d)$ if the input domain is substantially, e.g., almost, uniformly distributed, e.g., as defined by a threshold criterion.

When the input domain is not uniformly distributed, e.g., since most URLs have a "www" prefix, the processing system 118 can provide the web URL to a cryptographic hash function such as SHA256, so that the output is a 256-bit random value. The processing system 118 can then apply a mod function on to the output to further reduce the range of the output, e.g., $h_k(d)$=SHA-256 (d) mod m. This can provide a more uniform distribution for non-uniformly distributed source data.

The processing system 118 can generate k hash functions as described above. The processing system 118 can maintain each of the k hash functions in its own hash function database 128. The processing system 118 can send one or more of the k hash functions to each of the client devices A-C 102*a-c*, e.g., along with its public key for encrypting the messages.

When the processing system 118 provides a different hash function to each of the client devices A-C 102*a-c*, and only one hash function, the processing system 118 can maintain a mapping that indicates which hash function was provided to which client device A-C 102*a-c*. Upon receiving a message from one of the client devices A-C 102*a-c*, the processing system 118 can use the mapping to determine which hash function was used to generate data in the message.

When the processing system 118 provides multiple hash functions to at least some of the client devices A-C 102*a-c*, the client devices A-C 102*a-c* can include a hash function identifier in the messages they generate. For instance, when there are three hash functions, the client device A's 102*a* message engine can generate a message that includes both the combined data for the noise values and optionally the output value and an identifier for the one of the three hash functions used to generate the values. The client device A 102*a* would use the same hash function to generate all of the values for any particular message. The encryption engine 110 can then encrypt the hashed output values and the hash function identifier for transmission to the processing system.

When the processing system 118 receives values that can be generated using any of multiple hash functions, the processing system 118 maintains the matrix 122 as a three-dimensional data structure, e.g., array. For instance, the matrix can have a first array indexed by the hash function from the k hash functions. That first array can identify, for each hash function, a corresponding second array for the output values of that respective hash function. The second arrays can have a dimension m given the domain M. In implementations in which the domain's M vary given the hash function h, the second arrays can have different dimensions mk. In implementations in which all of the hash functions have the same domain M, all of the second arrays can have the same dimension m.

When the processing system 118 processes a received message, whether a singular message or a message from the data batch, the processing system can determine the hash function $h_j$ that applies to the message. The processing system 118 can then update the data structure for that corresponding hash function $h_j$. For instance, for the matrix M, the hash function $h_j$, and the value i from the message, the processing system 118 can update the location at M[j][i], e.g., M[j][i]=M[j][i]+1.

The messages have a size s that is smaller than the size of the domain M for the hash function. The domain M for the hash function is smaller than the size of all possible values for the source data d.

The message size s can be any appropriate value, determined by any appropriate device or system, or a combination of these. In some implementations, the client device A 102_a_ select the message size s. In these implementations, the client device A 102_a_ provides the message size to the processing system 118, e.g., as part of the message, or the processing system 118 can determine the message size s using data for the message, e.g., a number of entries in the message body. In some implementations, the processing system 118 determines the message size s and provides data that indicates the message size s to a respective client device 102_a_. At least some of the client devices 102_a-c_ can have the same message size s. At least some of the client devices 102_a-c_ can have different message sizes s.

The message size s can be determined using any appropriate process. For instance, the message size can be computed using a differential privacy parameter ε. In some examples, the message size can be determined using equation (4) below for which m is the hashing range for the domain M.

$$s = \frac{m}{(e^{\varepsilon} + 1)} \tag{4}$$

When the environment 100 uses different message sizes s for different devices 102_a-c_, the different message sizes s can be based on different hashing ranges m, different differential privacy parameters ε, or a combination of both.

The processing system 118 and the modification system 112 are each an example of a system implemented as computer programs on one or more computers in one or more locations, in which the systems, components, and techniques described in this specification are implemented. The client devices A-C 102_a-c_ can include personal computers, mobile communication devices, and other devices that can send and receive data over the network 132. The network 132, such as a local area network ("LAN"), wide area network ("WAN"), the Internet, or a combination thereof, connects the client devices A-C 102_a-c_, the modification system 112, and the processing system 118. The network 132 can be used to implement one or more encryption channels through which messages are communicated. The processing system 118, the modification system 112, or a combination of both, can use a single computer or multiple computers operating in conjunction with one another, including, for example, a set of remote computers deployed as a cloud computing service.

The processing system 118, the modification system 112, or both, can each include several different functional components, including the message modification engine 114, the shuffler engine 116, the matrix update engine 120, the decryption engine 124, the hash engine 126, and the prediction engine 130. The message modification engine 114, the shuffler engine 116, the matrix update engine 120, the decryption engine 124, the hash engine 126, the prediction engine 130, or a combination of these, can include one or more data processing apparatuses, can be implemented in code, or a combination of both. For instance, each of the message modification engine 114, the shuffler engine 116, the matrix update engine 120, the decryption engine 124, the hash engine 126, and the prediction engine 130 can include one or more data processors and instructions that cause the one or more data processors to perform the operations discussed herein.

The various functional components of the processing system 118, the modification system 112, or both, can be installed on one or more computers as separate functional components or as different modules of a same functional component. For example, the components of the processing system 118, the modification system 112, or both, can be implemented as computer programs installed on one or more computers in one or more locations that are coupled to each through a network. In cloud-based systems for example, these components can be implemented by individual computing nodes of a distributed computing system.

FIG. 2 is a flow diagram of an example process 200 for processing messages. For example, the process 200 can be used by one of the client devices A-C 102_a-c_, the modification system 112, the processing system 118, or a combination of these, from the environment 100.

A device selects, from two or more hash functions at least some of which have different collisions, a hash function (202). For instance, the device can select the hash function from a hash function database.

The device generates, using the hash function, a device output value (204). For instance, the device can provide source data d as input to the hash function. The device can receive the device output value as output from the hash function. The device output value can be in a hashing domain m for the hash function. The hashing domain m can have a maximum value, e.g., m or m−1, and a size, e.g., the total number of integer values in the domain.

The device generates, using the hash function and a message size, one or more noise values (206). For instance, the device uses the same hash function used to generate the device output value to generate the one or more noise values.

The device determines whether to include the output value in a message (208). The device can use any appropriate process to perform this determination. For instance, the device can make this determination randomly, e.g., using a random number generator.

The device generates a message that includes the one or more noise values and the output value (210). The device can generate the message that includes the output value and the noise values in response to determining to include the output value in the message. The message can include one or more noise values and the output value.

The device generates a message that includes only the one or more noise values (212). The device can perform this operation in response to determining to not include the output value in the message. In these examples, the device can include two or more noise values in the message. For instance, the device can maintain a size for the message. The size can indicate a number of values to include in the message. Since the device would include both the output value and at least one noise value in the message if the device were including the output value in the message, the minimum size for the message can be two. As a result, when the device does not include the output value in the message, the device can include at least two noise values in the message, and optionally more noise values given the size of the message.

The device can determine the message size using any appropriate process. For example, the device can maintain the size in memory. The device can receive the message size from another system, e.g., the processing system. In some examples, the device can compute the message size, e.g., using a differential privacy parameter. The differential privacy parameter can affect a degree of security for data encoded in the message, privacy for the data, a communication cost for the message, e.g., in computational resources, or a combination of two or more of these.

A first system, e.g., of one or more first computers, removes device specific data from the message (214). For instance, after generating the message whether with the output value or not, the first system, e.g., a modification system, can receive the message. The modification system can remove the device specific data, and optionally other data, from the message.

The first system generates a data batch that includes the messages in a randomly shuffled order (216). For example, the modification system can use any appropriate process to generate the data batch that includes multiple messages at least some of which were generated by different client devices.

A second system stores data from the message in a matrix for the hash function (218). For instance, the matrix can be specific to the hash function or maintain data for multiple hash functions. When the matrix maintains data for multiple hash functions, the second system can store the data for the message in a portion of the matrix that is specific to the hash function, e.g., using an identifier for the hash function. The second system can determine the identifier using data from the message, e.g., an identifier included in the message, a mapping that indicates which devices use corresponding hash functions, or a combination of both.

The second system determines, using a second output value as an index for a matrix that maintains anonymized data from messages received from a plurality of devices, a total count of the output value (220). For example, after updating the matrix given data from multiple different messages, the second system can receive a request for data specific to a request value. The second system can use the request value to determine a hash value for the request value that is in the corresponding domain M. When the second system uses multiple hash functions, the second system can determine a corresponding hash value for each of the hash functions. The request value can be any appropriate value, e.g., the same as the source data d or another value.

The second system predicts a quantity of times the first value was a cause of a message received from one of multiple devices (222). The second system can perform the prediction using any appropriate process. Some examples of input values for the process, e.g., equation (1) above, can include a total count of the second output value, a size of the hashing domain for the hash function, a probability that a device from the plurality of devices included the output value in a corresponding message, a value based on a differential privacy parameter, or a combination of two or more of these.

The second system can perform an action using the predicted quantity of times (224). For instance, the second system can provide instructions to another device, e.g., a requesting device that sent the request value to the second system. The instructions can cause the other device to present the predicted quantity of times on a display.

The order of operations in the process 200 described above is illustrative only, and the processing of the messages can be performed in different orders. For example, the process 200 can determine whether to include the output value in a message, e.g., perform operation 208, before any of operations 202, 204, or 206. In implementations in which operation 208 is performed before operation 204, the client device can use a result of operation 208 to determine whether to generate the device output, e.g., given the source data d. For instance, when the message will not include the output value, the client device can generate the message that includes the one or more noise values and determine to skip generating the device output value.

In some implementations, the process 200 can include additional operations, fewer operations, or some of the operations can be divided into multiple operations. For example, the process 200 can include operations 204, 206, 208 and either operation 210 or 212. In some examples, the process 200 might not include operation 204, e.g., and includes operation 206 and 208 and message generation. The process 200 can include operations 218 through 224. The process 200 can optionally include one or both of operations 214 or 216 along with the above mentioned permutations of the process 200.

In some implementations, the device might execute a social media application, e.g., a native application or by accessing a web site. The device and the processing system can collaborate on data processing when the device provides data to the processing system. By using one or more processes described in this specification, the device can provide data, e.g., data records, to the processing system without sharing particular user data that is associated with a corresponding user.

For situations in which the systems discussed here collect personal information about people, or may make use of personal information, the people may be provided with an opportunity to control whether programs or features collect personal information, or to control whether and/or how the system operates. In addition, as described above, data is anonymized in one or more ways before it is stored or used, so that personally identifiable information is removed. For example, the message modification engine can remove any device or other identification data from messages received from the client devices A-C. The shuffler engine can randomly permute an order in which messages are included in a data batch to reduce a likelihood of personally identifiable information being inferred from the data batch.

In this specification, the term "database" is used broadly to refer to any collection of data: the data does not need to be structured in any particular way, or structured at all, and it can be stored on storage devices in one or more locations. A database can be implemented on any appropriate type of memory.

In this specification the term "engine" is used broadly to refer to a software-based system, subsystem, or process that is programmed to perform one or more specific functions. Generally, an engine will be implemented as one or more software modules or components, installed on one or more computers in one or more locations. In some instances, one or more computers will be dedicated to a particular engine. In some instances, multiple engines can be installed and running on the same computer or computers.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

A number of implementations have been described. Nevertheless, it will be understood that various modifications can be made without departing from the spirit and scope of the disclosure. For example, various forms of the flows shown above can be used, with operations re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, a data processing apparatus. Alternatively or in addition, the program instructions can be encoded on an artificially-generated propagated signal, e.g., a machine-generated electrical, optical, or electromagnetic signal, that is generated to encode information for transmission to a suitable receiver apparatus for execution by a data processing apparatus. One or more computer storage media can include a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can be or include special purpose logic circuitry, e.g., a field programmable gate array ("FPGA") or an application-specific integrated circuit ("ASIC"). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can be performed by, and apparatus can also be implemented as, special purpose logic circuitry, e.g., a field programmable gate array ("FPGA") or an application-specific integrated circuit ("ASIC").

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. A computer can be embedded in another device, e.g., a mobile telephone, a smart phone, a headset, a personal digital assistant ("PDA"), a mobile audio or video player, a game console, a Global Positioning System ("GPS") receiver, or a portable storage device, e.g., a universal serial bus ("USB") flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a liquid crystal display ("LCD"), an organic light emitting diode ("OLED") or other monitor, for displaying information to the user and a keyboard and a pointing device, e.g., a mouse or a trackball or a touchscreen, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input. In some examples, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an Hypertext Markup Language ("HTML") page, to a user device, e.g., for purposes of displaying data to and receiving user input from a user device, which acts as a client. Data generated at the user device, e.g., a result of user interaction with the user device, can be received from the user device at the server.

Figure 3:
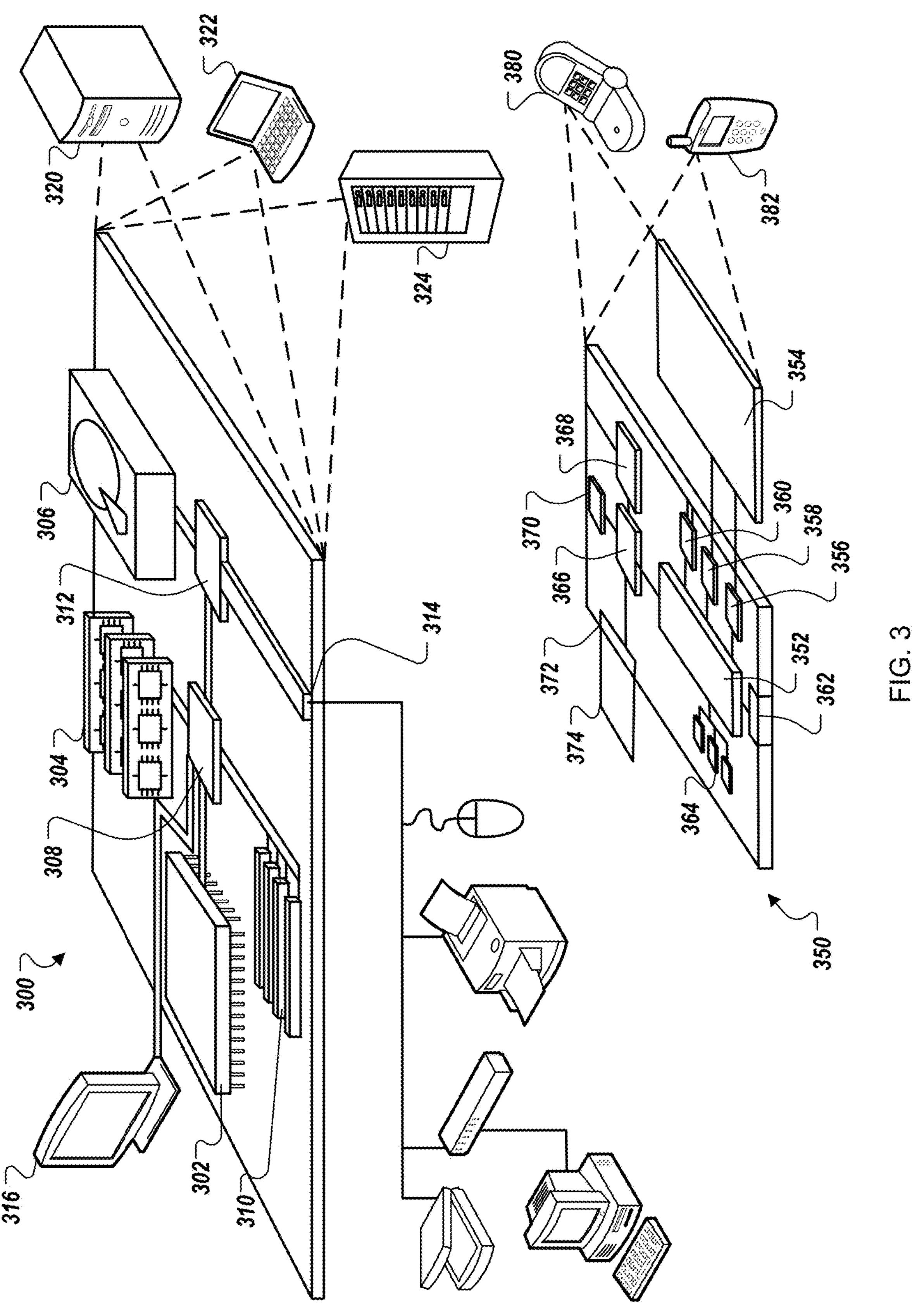
FIG. 3 is a block diagram of computing devices that may be used to implement the systems and methods described in this specification.

FIG. 3 is a block diagram of computing devices 300, 350 that may be used to implement the systems and methods described in this specification, as either a client or as a server system or plurality of server systems. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this specification.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a computer-readable medium. In one implementation, the memory 304 is a volatile memory unit or units. In another implementation, the memory 304 is a non-volatile memory unit or units.

The storage device 306 is capable of providing mass storage for the computing device 300. In one implementation, the storage device 306 is a computer-readable medium. In various different implementations, the storage device 306 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth-intensive operations. Such allocation of duties is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can process instructions for execution within the computing device 350, including instructions stored in the memory 364. The processor may also include separate analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD display or an OLED display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication (e.g., via a docking procedure) or for wireless communication (e.g., via Bluetooth or other such technologies).

The memory 364 stores information within the computing device 350. In one implementation, the memory 364 is a computer-readable medium. In one implementation, the memory 364 is a volatile memory unit or units. In another implementation, the memory 364 is a non-volatile memory unit or units. Expansion memory 374 may also be provided and connected to device 350 through expansion interface 372, which may include, for example, a SIMM card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provided as a security module for device 350, and may be programmed with instructions that permit secure use of device 350. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, Wi-Fi, or other such transceiver (not shown). In addition, GPS receiver module 370 may provide additional wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smartphone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

In addition to the embodiments of the attached claims and the embodiments described above, the following numbered embodiments are also innovative.

Embodiment 1 is a method comprising generating, using a hash function, an output value that is in a hashing domain for the hash function; accessing a message size that is a smaller value than a domain size of the hashing domain; generating, using the hash function and the message size, one or more noise values; generating a message that includes the one or more noise values; and providing, to an external system, the message.

Embodiment 1 may provide one or more of the following technical advantages or effects: improved data security because of the noise values, reduced computer resource, e.g., network, usage because the message size is smaller than the hash domain size, or both.

Embodiment 2 is a method comprising selecting, from two or more hash functions at least some of which have different collisions, a hash function; generating, using the hash function, an output value that is in a hashing domain for the hash function; generating a message that includes an identifier for the hash function using the output value; and providing, to an external system, the message.

Embodiment 2 may provide one or more of the following technical advantages or effects: reduced conflicts for hash results because of the selection of a hash function from two or more has functions.

Embodiment 3 is the method of any of embodiments 1-2, comprising selecting, from two or more hash functions at least some of which have different collisions, the hash function for generating the output value, wherein generating the message comprises generating the message that includes the one or more noise values and an identifier for the hash function.

Embodiment 4 is the method of any of embodiments 1-3, comprising: determining whether to include the output value in the message, wherein generating the message uses a result of the determination whether to include the output value in the message.

Embodiment 5 is the method of embodiment 4, comprising: determining not to include the output value in the message; and in response to determining not to include the output value in the message: generating a quantity of noise values that is the message size; and generating the message that includes the noise values without the output value.

Embodiment 6 is the method of any of embodiment 4-5, comprising: determining to include the output value in the message; and in response to determining to include the output value in the message: generating a quantity of noise values that is one fewer than the message size; and generating the message that includes the noise values and the output value.

Embodiment 7 is the method of any of embodiments 1-6, wherein: accessing the message size comprises computing the message size.

Embodiment 8 is the method of any of embodiments 1-7, wherein: the output value and the one or more noise values each comprise an index for the hash function in the hashing domain, the method comprising: randomly permuting locations of two or more values in the message before providing the message to the external system.

Embodiment 9 is the method of any of embodiments 1-8, wherein: providing the message to the external system comprises: encrypting the message; and providing the encrypted message to the external system.

Embodiment 10 is the method of any of embodiments 1-9, wherein: generating the message comprises: determining whether to include the output value in the message; and generating the message using a result of the determination whether to include the output value in the message.

Embodiment 11 is the method of embodiment 10, comprising: determining not to include the output value in the message; and in response to determining not to include the output value in the message: generating a quantity of noise values that is the message size; and generating the message that includes the noise values without the output value.

Embodiment 12 is the method of any of embodiments 10-11, comprising: determining to include the output value in the message; and in response to determining to include the output value in the message: generating a quantity of noise values that is one fewer than the message size; and generating the message that includes the noise values and the output value.

Embodiment 13 is the method of any of embodiments 1-12, comprising: accessing a message size that is less than a size of the hashing domain; and generating, using the hash function and the message size, one or more noise values, wherein generating the message comprises generating the message that includes the one or more noise values and the identifier for the hash function.

Embodiment 14 is the method of embodiment 13, wherein: the output value and the one or more noise values each comprise an index for the hash function in the hashing domain, the method comprising: randomly permuting locations of two or more values in the message before providing the message to the external system.

Embodiment 15 is a method comprising determining, using a first value as input to a hash function, an output value; determining, using the output value as an index for a matrix that maintains anonymized data from messages received from a plurality of devices, a total count of the output value; predicting a quantity of times the first value was a cause of a message received from one of the plurality of devices using the total count of the output value, a size of a hashing domain for the hash function, and a probability that a device from the plurality of devices included the output value in a corresponding message; and performing an action using the predicted quantity of times the first value was the cause of a message received from one of the plurality of devices.

Embodiment 15 may provide one or more of the following technical advantages or effects: improved data security given the use of the matrix that maintains anonymized data, prediction of the quantity of times using the described computation, or both.

Embodiment 16 is the method of embodiment 15, wherein: predicting the quantity of times the first value was the cause of a message received from one of the plurality of devices uses the total count of the output value, the size of the hashing domain for the hash function, the probability that a device from the plurality of devices included the output value in a corresponding message, and a value based on a differential privacy parameter.

Embodiment 17 is the method of embodiment 16, comprising: generating, by a client device in the system and using the hash function, a device output value that is in the hashing domain for the hash function; accessing, by the client device, a message size that is a smaller value than a size of the hashing domain for the hash function and is based on the differential privacy parameter; generating, by the client device and using the hash function and the message size, one or more noise values; generating, by the client device, a message that includes the one or more noise values; and storing, by one or more second computers separate from the client device, data from the message in the matrix.

Embodiment 18 is the method of embodiment 17, comprising: encrypting, by the client device, the message; providing, by the client device and to at least one of the one or more second computers, the encrypted message; decrypting, by at least some of the one or more second computers, the encrypted message; storing, by the one or more second computers, data from the decrypted message in the matrix.

Embodiment 19 is the method of embodiment 18, wherein: providing the encrypted message by the client device and to at least one of the one or more second computers comprises: by one or more modification computers: receiving the encrypted message; generating a second encrypted message by removing device specific data from the encrypted message; for a batch of messages received from different client devices in an order, generating a data batch that includes the second encrypted message and in which locations of the messages are randomly shuffled from the order in which the messages were received; and transmitting, to the one or more second computers, the data batch that includes the second encrypted message.

Embodiment 20 is the method of embodiment 15, wherein: the matrix is a three-dimensional matrix that comprises a first vector with a first dimension for different hash functions and one or more second vectors each of which have a second dimension for the corresponding hash function; and the method comprising: determining, for a message received from a client device and that includes two or more output values, a hash function identifier included in the message; determining, using the hash function identifier, a first location in the first vector that represents the hash function; and updating, for each of the two or more output values, a hash specific total count in a corresponding location of the second vector for the hash function.

Embodiment 21 is a system comprising: one or more computers and one or more storage devices storing instructions that are operable, when executed by the one or more computers, to cause the one or more computers to perform the method of any one of embodiments 1 to 20.

Embodiment 22 is a computer program carrier encoded with a computer program, the program comprising instructions that are operable, when executed by one or more computers, to cause the one or more computers to perform the method of any one of embodiments 1 to 20.

Embodiment 23 is the computer program carrier of embodiment 22, wherein the computer program carrier is a propagated, e.g., non-transitory, signal.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some instances be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures, such as spreadsheets, relational databases, or structured files, may be used.

Particular implementations of the invention have been described. Other implementations are within the scope of the following claims. For example, the operations recited in the claims, described in the specification, or depicted in the figures can be performed in a different order and still achieve desirable results. In some implementations, multitasking and parallel processing may be advantageous.

What is claimed is:

1. A computer-implemented method to improve a differential privacy system that comprises one or more computers, the method comprising:

by the differential privacy system:

generating, for a client device and using original data from the client device as input to a hash function of a software module installed on at least one of the one or more computers, an output value that is in a hashing domain for the hash function, the hashing domain indicating the possible outputs of the hash function and having a domain size;

determining randomly whether to include the output value that is a hash of the original data or at least one noise value in a message;

accessing, from a memory included in one of the one or more computers, a message size criterion that indicates a smaller value than the domain size of the hashing domain;

generating, using the hash function of the software module and the message size, one or more noise values;

in response to determining to not include the output value and to include at least one noise value in the message, generating the message that includes the one or more noise values instead of the output value and that satisfies the message size criterion that is a smaller value than the domain size of the hashing domain; and transmitting, to an external system and using an encrypted channel on a network, the message.

2. The method of claim 1, comprising selecting, from two or more hash functions at least some of which have different collisions, the hash function for generating the output value, wherein generating the message comprises generating the message that includes the one or more noise values and an identifier for the hash function.

3. The method of claim 1, comprising:

determining not to include the output value in the message; and in response to determining not to include the output value in the message:

generating a quantity of noise values that is the message size; and generating the message that includes the noise values without the output value.

4. The method of claim 1, comprising:

determining to include the output value in the message; and in response to determining to include the output value in the message:

generating a quantity of noise values that is one fewer than the message size; and generating the message that includes the noise values and the output value.

5. The method of claim 1, wherein accessing the message size comprises computing the message size.

6. The method of claim 1, wherein:

the output value and the one or more noise values each comprise an index for the hash function in the hashing domain, the method comprising:

randomly permuting locations of two or more values in the message before providing the message to the external system.

7. The method of claim 1, wherein providing the message to the external system comprises:

encrypting the message; and providing the encrypted message to the external system.

8. One or more non-transitory computer storage device encoded with instructions that, when executed by a differential privacy system comprising one or more computers, causes the differential privacy system that comprises the one or more computers to perform operations comprising:

selecting, from two or more hash functions at least some of which have different collisions and each of which have a different hash function identifier, a hash function for a software module installed on at least one of the one or more computers and that has a particular hash function identifier;

determining randomly whether to include an output value in a message;

generating, for a client device and using original data from the client device as input to the hash function of the software module that has the particular hash function identifier, the output value that is in a hashing domain for the hash function;

generating, using the output value, the message that includes the particular hash function identifier for the hash function; and transmitting, to an external system and using an encrypted channel on a network, the message that includes the particular hash function identifier for the hash function.

9. The computer storage device of claim 8, wherein generating the message comprises:

determining whether to include the output value in the message; and generating the message using a result of the determination whether to include the output value in the message.

10. The computer storage device of claim 9, the operations comprising:

determining not to include the output value in the message; and in response to determining not to include the output value in the message:

generating a quantity of noise values that is the message size; and generating the message that includes the noise values without the output value.

11. The computer storage device of claim 9, the operations comprising:

determining to include the output value in the message; and in response to determining to include the output value in the message:

generating a quantity of noise values that is one fewer than the message size; and generating the message that includes the noise values and the output value.

12. The computer storage device of claim 8, the operations comprising:

accessing a message size that is less than a size of the hashing domain; and generating, using the hash function and the message size, one or more noise values, wherein generating the message comprises generating the message that includes the one or more noise values and the identifier for the hash function.

13. The computer storage device of claim 12, wherein:

the output value and the one or more noise values each comprise an index for the hash function in the hashing domain, the operations comprising:

randomly permuting locations of two or more values in the message before providing the message to the external system.

14. A system for improved differential privacy and comprising one or more computers each of which includes at least one processor and one or more storage devices on which are stored instructions that are operable, when executed by the one or more computers, to cause the one or more computers to perform operations comprising:

generating, for a client device and using original data from the client device as input to a hash function of a software module installed on at least one of the one or more computers, an output value that is in a hashing domain for the hash function, the hashing domain indicating the possible outputs of the hash function and having a domain size;

determining randomly whether to include the output value that is a hash of the original data or at least one noise value in a message;

accessing, from a memory included in one of the one or more computers, a message size criterion that indicates a smaller value than the domain size of the hashing domain;

generating, using the hash function of the software module and the message size, one or more noise values;

in response to determining to not include the output value and to include at least one noise value in the message, generating the message that includes the one or more noise values instead of the output value and that satisfies the message size criterion that is a smaller value than the domain size of the hashing domain; and transmitting, to an external system and using an encrypted channel on a network, the message.

15. The system of claim 14, the operations comprising selecting, from two or more hash functions at least some of which have different collisions, the hash function for generating the output value, wherein generating the message comprises generating the message that includes the one or more noise values and an identifier for the hash function.

16. The system of claim 14, the operations comprising:

determining not to include the output value in the message; and in response to determining not to include the output value in the message:

generating a quantity of noise values that is the message size; and generating the message that includes the noise values without the output value.

17. The system of claim 14, the operations comprising:

determining to include the output value in the message; and in response to determining to include the output value in the message:

generating a quantity of noise values that is one fewer than the message size; and generating the message that includes the noise values and the output value.

18. The system of claim 14, wherein accessing the message size comprises computing the message size.

19. The system of claim 14, wherein:

the output value and the one or more noise values each comprise an index for the hash function in the hashing domain, the method comprising:

randomly permuting locations of two or more values in the message before providing the message to the external system.

* * * * *